F. HACHMANN.
PISTON RING.
APPLICATION FILED FEB. 5, 1919.
1,348,641.
Patented Aug. 3, 1920.
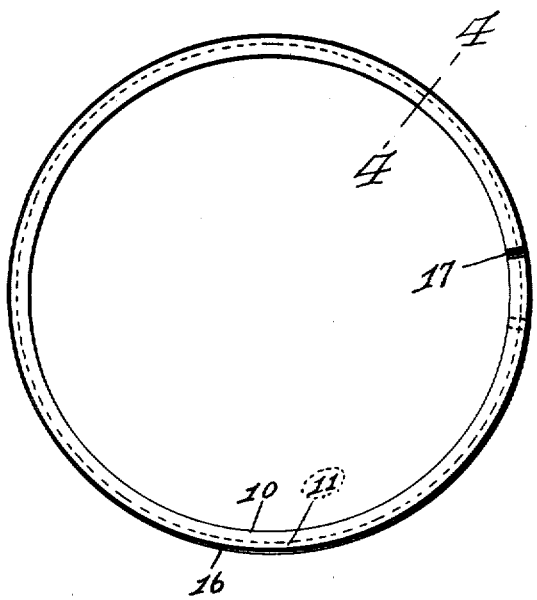
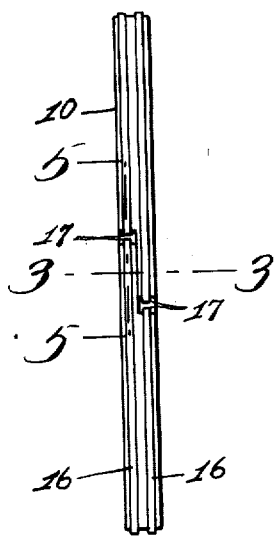
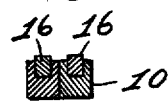
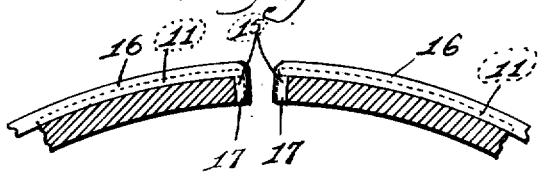
Inventor:
Frederick Hachmann
By Edward E. Longan
atty.

UNITED STATES PATENT OFFICE.

FREDERICK HACHMANN, OF ST. LOUIS, MISSOURI, ASSIGNOR OF ONE-HALF TO HERMAN STIEFEL, OF ST. LOUIS, MISSOURI, ONE-EIGHTH TO DAVID M. HUTCHINSON, OF FERGUSON, MISSOURI, AND ONE-SIXTEENTH TO PHILIP E. MOODY, ONE-SIXTEENTH TO CHAUNCEY R. WATSON, AND ONE-SIXTEENTH TO H. A. WRIGHT, ALL OF DETROIT, MICHIGAN.

PISTON-RING.

1,348,641.     Specification of Letters Patent.     Patented Aug. 3, 1920.

Application filed February 5, 1919. Serial No. 275,137.

*To all whom it may concern:*

Be it known that I, FREDERICK HACHMANN, a citizen of the United States, and resident of the city of St. Louis and State of Missouri, have invented certain new and useful Improvements in Piston-Rings, of which the following is a specification containing a full, clear, and exact description, reference being had to the accompanying drawings, forming a part thereof.

My invention relates to improvements in piston rings and has for its primary object a ring in which the ring surface and the inner surface of the cylinder are brought close together. A further object is to provide a metal piston ring with a strip or strips of metal softer than the cylinder or piston ring so as to provide a quick wearing surface. It has been found in practice that piston rings of the present construction are not true circles and therefore do not work or fit snugly against the cylinder walls allowing a certain amount of leakage. By my construction this defect is entirely overcome.

In the drawings:

Figure 1 is a side elevation of my improved ring.

Fig. 2 is an edge view.

Fig. 3 is a section taken on the line 3—3 of Fig. 2.

Fig. 4 is a section taken on the line 4—4 of Fig. 1.

Fig. 5 is a section taken on the line 5—5 of Fig. 2.

Fig. 6 is a fragmental section illustrating one end of the ring, that is, the lapped portion.

Referring to the drawings, 10 indicates a piston ring which is of the ordinary construction. In this piston ring are located grooves 11 and 12, these grooves being located near each edge and extending to the lap or, in other words, practically around the ring.

The ends 13 and 14 of the grooves 11 and 12 which run into the lapped portion are provided with a recess 15. In the grooves 11 and 12 are located rings 16 which are made of brass or other similar material, in fact, anything softer than the piston rings or cylinder casing, but still having resiliency. The ends of these rings are bent inwardly forming tongues 17 which fit in the recess.

These rings as previously stated are made out of metal softer than the ring or cylinder and I preferably employ brass or a composition of copper and zinc or a composition of zinc, lead and tin so as to afford a quick wearing surface and prevent leakage until the body is worn down to fit the cylinder walls, in other words, these rings, when they are first installed, do not form a tight fit, but in view of the fact that they wear quickly, they soon wear down to tightly fit the cylinder and maintain a fluid tight joint until the ring itself has worn down to fit the cylinder wall.

Having fully described my invention, what I claim is:

A one piece piston ring provided with a lapped portion and with parallel grooves extending throughout the periphery of the ring and into the lapped portions, a cutaway portion formed at each end of the lapped portion and extending from the parallel grooves to the interior face of the ring, a metallic ring of softer material than the piston ring seated in each groove, and inwardly bent ends formed on each end of the metallic ring for holding the metallic ring against rotation, said inwardly bent ends being seated in the grooves formed in the lapped portion.

In testimony whereof I have signed my name to this specification, in presence of two subscribing witnesses.

FREDERICK HACHMANN.

Witnesses:
   MARGUERITE E. FULTON,
   ELIZABETH CARTALL,